United States Patent
Coomer

(10) Patent No.: US 12,551,761 B2
(45) Date of Patent: Feb. 17, 2026

(54) MACHINE LEARNING POWERLIFTING TRAINING SYSTEM

(71) Applicant: Barbell AI, South Jordan, UT (US)

(72) Inventor: Benjamin Coomer, American Fork, UT (US)

(73) Assignee: Barbell AI, American Fork, UT (US)

( * ) Notice: Subject to any disclaimer, the term of this patent is extended or adjusted under 35 U.S.C. 154(b) by 443 days.

(21) Appl. No.: 18/342,245

(22) Filed: Jun. 27, 2023

(65) Prior Publication Data

US 2025/0001260 A1 Jan. 2, 2025

(51) Int. Cl.
A63B 24/00 (2006.01)

(52) U.S. Cl.
CPC ...... *A63B 24/0075* (2013.01); *A63B 24/0006* (2013.01); *A63B 2024/0015* (2013.01)

(58) Field of Classification Search
CPC ...................................................... A63B 24/00
See application file for complete search history.

(56) References Cited

U.S. PATENT DOCUMENTS

| | | | |
|---|---|---|---|
| 11,806,580 B1 * | 11/2023 | Nolan | G16H 20/30 |
| 2018/0070864 A1 | 3/2018 | Schuster | |
| 2018/0268738 A1 * | 9/2018 | Miller | G06F 3/011 |
| 2018/0361203 A1 * | 12/2018 | Wang | G06N 20/00 |
| 2021/0008413 A1 * | 1/2021 | Asikainen | G06F 3/0304 |
| 2021/0315486 A1 | 10/2021 | Delp et al. | |
| 2022/0241642 A1 * | 8/2022 | Halevy | A61B 5/744 |
| 2022/0370853 A1 * | 11/2022 | Henderson | A41D 13/0015 |
| 2023/0028833 A1 * | 1/2023 | Ng | A61B 5/1118 |
| 2023/0043862 A1 * | 2/2023 | Mrvaljevic | A61B 5/1118 |
| 2023/0060394 A1 * | 3/2023 | Okur | G06T 7/0012 |
| 2023/0201665 A1 * | 6/2023 | Cei | G06V 40/172 |
| | | | 482/8 |
| 2024/0042281 A1 * | 2/2024 | Kashyap | G06T 11/206 |

FOREIGN PATENT DOCUMENTS

| | | |
|---|---|---|
| CN | 113100755 B | 1/2023 |
| WO | 2020257777 A1 | 12/2020 |
| WO | WO-2024238650 A2 * | 11/2024 ......... A63B 21/0442 |

* cited by examiner

*Primary Examiner* — Reginald A Renwick
(74) *Attorney, Agent, or Firm* — Jeremy Briggs

(57) ABSTRACT

A powerlifting training method is disclosed. The method may include obtaining a powerlifting video associated with a user from a user device. The powerlifting video may include a plurality of frames. The method may further include obtaining a plurality of body identification data associated with each frame from a server. Further, the method may include generating a plurality of feature maps associated with the plurality of frames by using a first trained machine learning module. The method may additionally include merging the plurality of body identification data and the plurality of feature maps to create a merged dataset. The method may further include determining, via a second trained machine learning module, one or more recommendations based on the merged dataset. Furthermore, the method may include transmitting the recommendations to the user device.

20 Claims, 6 Drawing Sheets

| Body ID X position | Body ID Y position | Body ID Z position | Frame Number |
|---|---|---|---|
| Nose X | Nose Y | Nose Z | 1 |
| 4 | 256 | 12 | 1 |
| Neck X | Neck Y | Neck Z | 1 |
| 4 | 254 | 12 | 1 |
| ShoulderRight X | ShoulderRight Y | ShoulderRight Z | 1 |
| 8 | 230 | 14 | 1 |
| ElbowRight X | ElbowRight Y | ElbowRight Z | 1 |
| 12 | 215 | 18 | 1 |

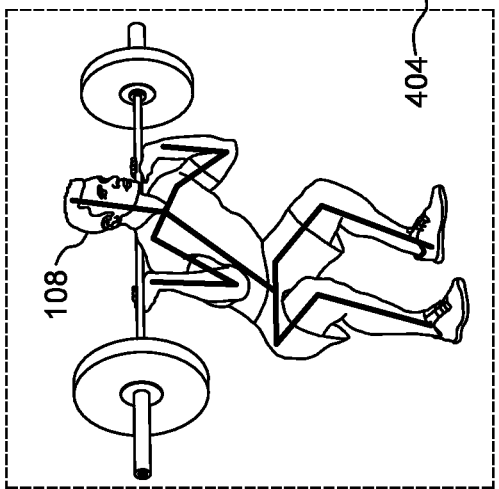

| Body ID X position | Body ID Y position | Body ID Z position | Frame Number |
|---|---|---|---|
| Nose X | Nose Y | Nose Z | 5 |
| 4 | 234 | 12 | 5 |
| Neck X | Neck Y | Neck Z | 5 |
| 4 | 232 | 12 | 5 |
| ShoulderRight X | ShoulderRight Y | ShoulderRight Z | 5 |
| 8 | 215 | 16 | 5 |
| ElbowRight X | ElbowRight Y | ElbowRight Z | 5 |
| 12 | 202 | 22 | 5 |

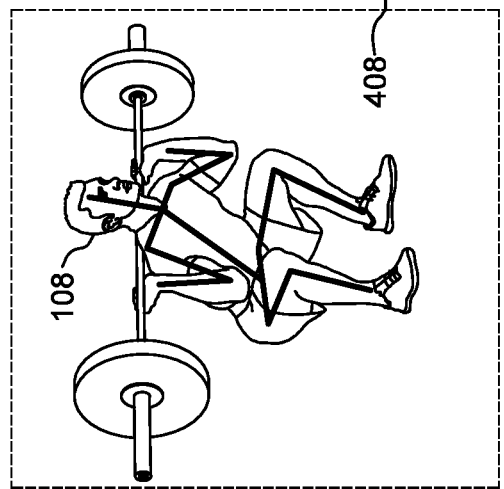

FIG. 4

MACHINE LEARNING POWERLIFTING TRAINING SYSTEM

TECHNICAL FIELD

The present disclosure relates to a powerlifting training system, and more particularly, to a machine learning powerlifting training system that provides recommendations to a user to enhance a powerlifting activity and mitigate user muscle imbalance.

BACKGROUND

Many users regularly exercise or perform physical activities such as running, cycling, rowing, etc. to stay healthy. Some users also engage in specialized physical activities such as powerlifting to build muscles. Such users typically hire professional trainers who train and guide the users, when the users engage in powerlifting activities. While the professional trainers may be effective in providing customized training and feedback to the users, such trainers are generally expensive and not easily accessible.

The users who do not hire professional trainers typically perform the powerlifting activities by self-education, e.g., by watching powerlifting videos on the Internet. Performing powerlifting activities based on self-education may be harmful and the users may get injured in the absence of correct training and feedback. Specifically, powerlifting videos on the Internet are typically generic in nature and are not customized for each user's physiology or body type. Performing powerlifting activities by watching generic training videos may result in ineffective training, or in some scenarios injury to the users.

Thus, there exists a need for a system and method to provide effective powerlifting training to users.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 depicts snapshots of example body identification data in accordance with the present disclosure.

DETAILED DESCRIPTION

Overview

Figure 1:
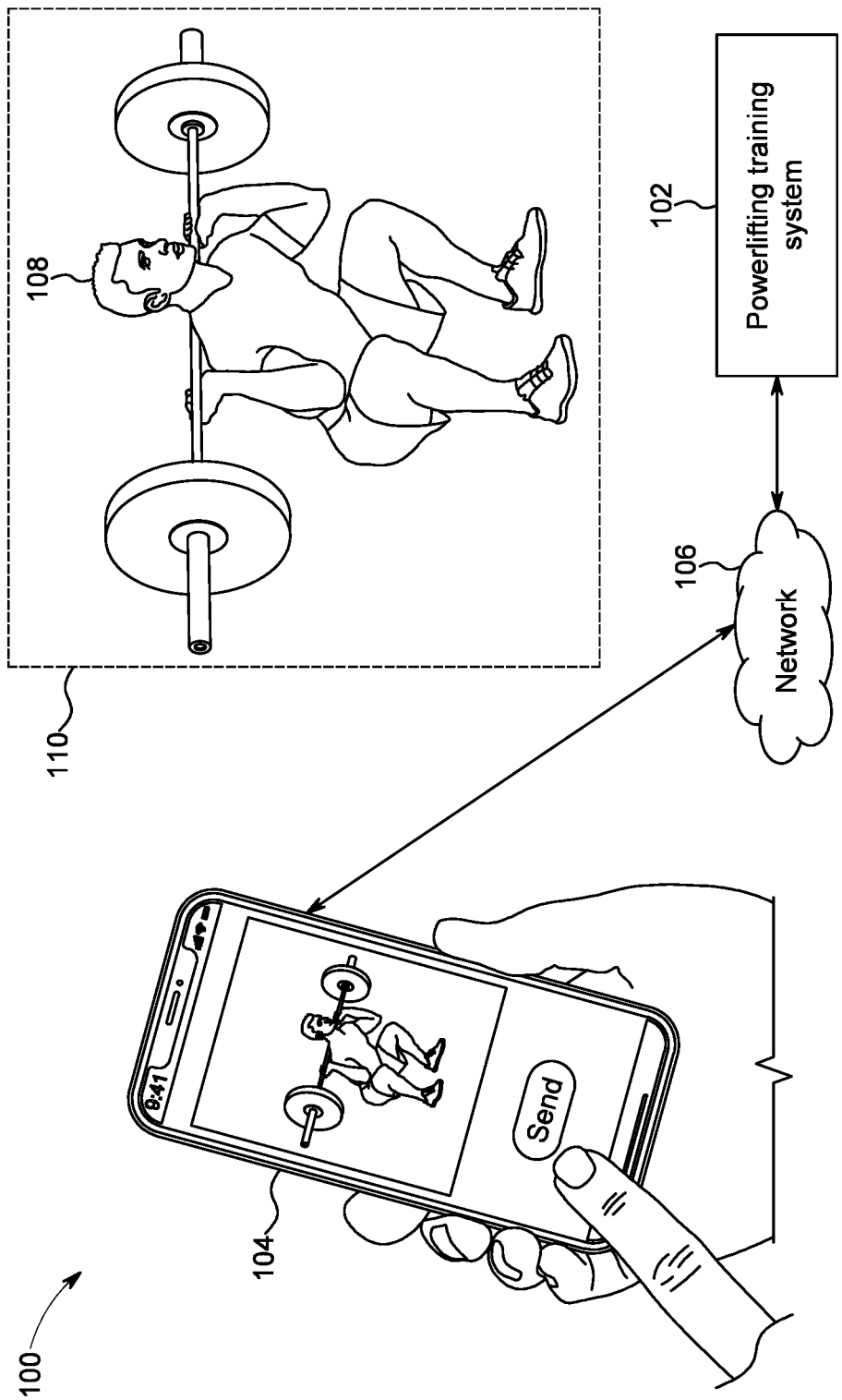
FIG. 1 depicts an example environment in which techniques and structures for providing the systems and methods disclosed herein may be implemented.

The present disclosure describes a powerlifting training system and method that may assist a user in improving a powerlifting activity being performed by the user and/or mitigating user muscle imbalance(s). The system may receive a video (e.g., a powerlifting video) of the user performing the powerlifting activity from a user device. The powerlifting activity may be, for example, squats, deadlift, bench, and/or the like. Responsive to receiving the video, the system may transmit the video to an external server, which may analyze the video and transmit a plurality of body identification data to the system. In an exemplary aspect, the plurality of body identification data may include X, Y, Z coordinate locations (e.g., pixel coordinates) of each user body part in each frame of the powerlifting video. The system may determine velocity data and angular displacement data associated with each body part when the user may be performing the powerlifting activity by using the plurality of body identification data.

In addition, the system may execute a first trained machine learning module to generate a plurality of feature maps associated with each frame of the powerlifting video. Responsive to generating the plurality of feature maps, the system may fuse or merge the plurality of feature maps and the body identification data to create a merged dataset. The system may then execute a second trained machine learning module and analyze the merged database to determine one or more anomalies in the powerlifting activity being performed by the user and/or one or more muscle imbalances that the user may have, based on the analysis.

Responsive to determining the anomalies in the powerlifting activity, the system may determine one or more improvement recommendations for the user to improve/enhance the powerlifting activity. In a similar manner, responsive to determining the muscle imbalance(s), the system may determine one or more mitigation recommendations for the user to mitigate the muscle imbalance(s). The system may transmit the improvement recommendations and/or the mitigation recommendations to the user device for the user to view and implement the recommendations.

In further aspects, the system may execute the second trained machine learning module and calculate a powerlifting score associated with the powerlifting activity, based on the analysis of the merged dataset. The system may transmit the calculated powerlifting score to the user device, in addition to transmitting the improvement recommendations and/or the mitigation recommendations.

In additional aspects, the system may obtain inputs from a Light Detection and Ranging (lidar) sensor and/or an inertial measurement unit (IMU) and determine recommendations and/or powerlifting score for the user with a higher confidence based on the obtained inputs. In this case, the system may fuse the merged dataset and the obtained inputs to determine the recommendations and/or the powerlifting score.

The present disclosure discloses a powerlifting system and method. The system provides recommendations to improve the powerlifting activity based on the powerlifting video provided by the user. Therefore, the recommendations are customized for each user and user's physiology. The system further provides recommendations to mitigate user muscle imbalances, thereby enabling the user to enhance the powerlifting activity over a time duration. The system provides real-time feedback and improvement recommendations to the user when the user performs the powerlifting activity, thereby eliminating the need for the user to hire a professional trainer.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a powerlifting training system 102 and a user device 104 communicatively coupled with each other via one or more networks 106 (or a network 106). The user device 104 may be, for example, a mobile phone, a laptop, a computer, a tablet, a smartwatch, or any other device with communication capabilities.

The network 106 may be, for example, a communication infrastructure in which the connected devices discussed in various embodiments of this disclosure may communicate. The network 106 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The powerlifting training system 102 (or system 102), as described herein, can be implemented in hardware, software (e.g., firmware), or a combination thereof. The system 102 may be hosted on one or more servers (not shown) and may provide an online platform or an application ("app") that may facilitate a user to transmit an exercise video to the system 102 and receive feedback on the exercise activity from the system 102. The system 102 may be an Artificial Intelligence (AI)/Machine Learning (ML) based system that may analyze the received exercise video by using one or more AI/ML based algorithms and determine one or more anomalies in the exercise video and/or one or more muscle imbalances that the user may have, based on the video analysis. The system 102 may further determine and transmit, to a user device, recommendations to enhance the exercise activity based on the determined anomalies and recommendations to mitigate the determined muscle imbalance(s).

Specifically, a user 108 (or any other person) may capture a video of the user 108 performing the exercise activity by using the user device 104 or any other video capturing device (e.g., a camera installed in the environment in which the user 108 may be performing the exercise activity). In an exemplary aspect, the user 108 may be performing a powerlifting activity, e.g., a squat, a deadlift, bench, and/or the like, as shown in view 110 of FIG. 1. The user 108 may transmit the exercise/powerlifting video, via the user device 104 and the network 106, to the system 102.

Responsive to receiving the powerlifting video, the system 102 may transmit the powerlifting video to an external server (shown as server 204 in FIG. 2) that may perform image processing on the powerlifting video and identify a plurality of body identification data associated with the user 108 and the powerlifting video. The concept of body identification data is described in detail in conjunction with FIGS. 2 and 4. Responsive to identifying the plurality of body identification data, the external server may transmit the plurality of body identification data to the system 102.

The system 102 may obtain the plurality of body identification data from the external server. In addition, the system 102 may execute instructions stored in a trained machine learning module (e.g., a first trained machine learning module that may be pre-stored in a system memory) and generate a plurality of feature maps/vector maps associated with each frame of the powerlifting video. Responsive to generating the feature maps, the system 102 may merge or fuse the body identification data with the feature maps to create a merged dataset for each frame of the powerlifting video.

The system 102 may then execute instructions stored in a second trained machine learning module to analyze the merged dataset and determine one or more anomalies in the powerlifting video and/or one or more muscle imbalances that the user may have, as described above. In some aspects, the second trained machine learning module may be trained by using a labeled training data that may include information associated with a plurality of correct or "good" powerlifting videos and a plurality of incorrect or "bad" powerlifting videos. The system 102 may additionally calculate, by using the instructions stored in the second trained machine learning module, a powerlifting score associated with the powerlifting video based on the determined one or more anomalies. Furthermore, the system 102 may determine one or more recommendations to enhance the powerlifting activity and mitigate the determined muscle imbalance(s) based on the analysis of the merged database and the instructions stored in the second trained machine learning module.

The system 102 may then transmit the recommendations and/or the powerlifting score to the user device 104, via the network 106, for the user 108 to view and implement the recommendations to enhance the powerlifting activity (e.g., to improve the deadlift). In this manner, the system 102 may facilitate the user 108 in receiving feedback on the powerlifting activity that the user 108 may be performing and improve the activity, without requiring assistance from a professional trainer. Further, since the system 102 provides the recommendations and/or the powerlifting score based on the powerlifting video associated with the user 108, the recommendations and/or the powerlifting score are customized according to user's physiology, and hence is not "generic" in nature.

Functional details of the system 102 are described below in conjunction with FIG. 2.

Figure 2:
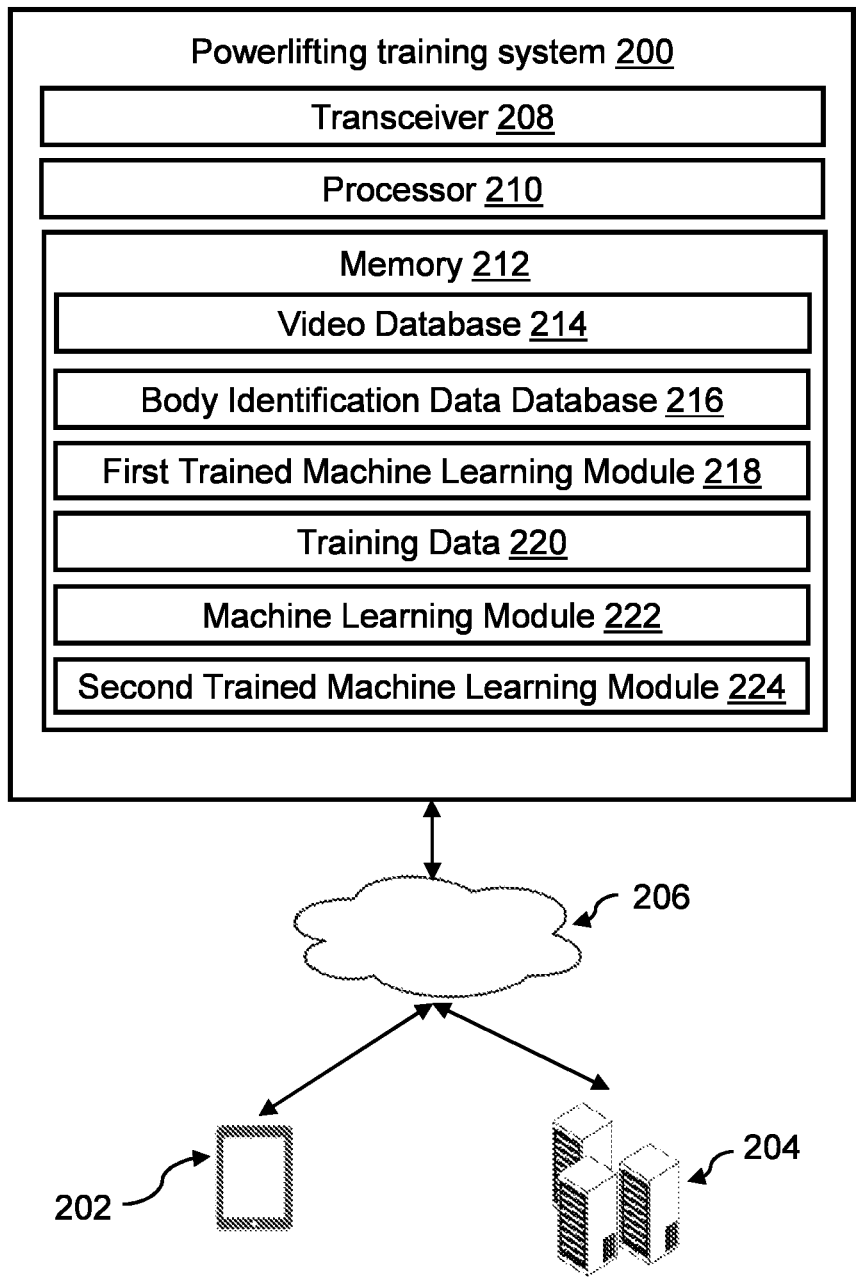
FIG. 2 depicts a block diagram of an example powerlifting training system in accordance with the present disclosure.

FIG. 2 depicts a block diagram of an example powerlifting training system 200 in accordance with the present disclosure. The system 200 may be same as the system 102 described above in conjunction with FIG. 1. While describing FIG. 2, references may be made to FIGS. 3-5.

The system 200 may be communicatively connected with a user device 202 and one or more server(s) 204 (or a server 204) via a network 206. The user device 202 may be same as the user device 104 and the network 206 may be same as the network 106. The server 204 may be same as the external server described above in conjunction with FIG. 1, which provides the plurality of data identification data to the system 200. The concept of data identification data is described later in the description below.

The system 200 may include one or more components or units including, but not limited to, a transceiver 208, a processor 210 and a memory 212. In some aspects, the memory 212 may store programs in code and/or store data for performing various system operations in accordance with the present disclosure. Specifically, the processor 210 may be configured and/or programmed to execute computer-executable instructions stored in the memory 212 for performing various system functions in accordance with the disclosure. Consequently, the memory 212 may be used for storing code and/or data code and/or data for performing operations in accordance with the present disclosure.

In one or more aspects, the processor 210 may be disposed in communication with one or more memory devices (e.g., the memory 212 and/or one or more external databases (not shown in FIG. 2)). The memory 212 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 212 may be one example of a non-transitory computer-readable medium and may be used to store programs in code and/or to store data for performing various operations in accordance with the present disclosure. The instructions in the memory 212 can include one or more separate programs, each of which can include an ordered listing of computer-executable instructions for implementing logical functions.

In some aspects, the memory 212 may include a plurality of modules and databases including, but not limited to, a video database 214, a body identification data database 216, a first trained machine learning module 218, training data 220, a machine learning module 222, and a second trained machine learning module 224.

The video database 214 may be configured to store one or more videos that the system 200 may receive from external devices, e.g., the user device 202. The body identification data database 216 may be configured to store the plurality of body identification data that the system 200 may receive from the server 204. The training data 220 may include a plurality of correct or "good" powerlifting videos and a plurality of incorrect or "bad" powerlifting videos. The training data 220 may further include data correlating one or more muscle imbalances with the plurality of good and bad powerlifting videos. The training data 220 is described later in the description below in conjunction with FIG. 3.

The first trained machine learning module 218, the machine learning module 222, and the second trained machine learning module 224, as described herein, may be stored in the form of computer-executable instructions, and the processor 210 may be configured and/or programmed to execute the stored computer-executable instructions for performing system functions in accordance with the present disclosure. In some aspects, the system 200 may obtain the first trained machine learning module 218 from one or more external servers (not shown) and may store the first trained machine learning module 218 in the memory 212. In some aspects, the first trained machine learning module 218 may be associated with a neural network algorithm that may assist the processor 210 in generating feature maps for each frame of a video.

Figure 3:
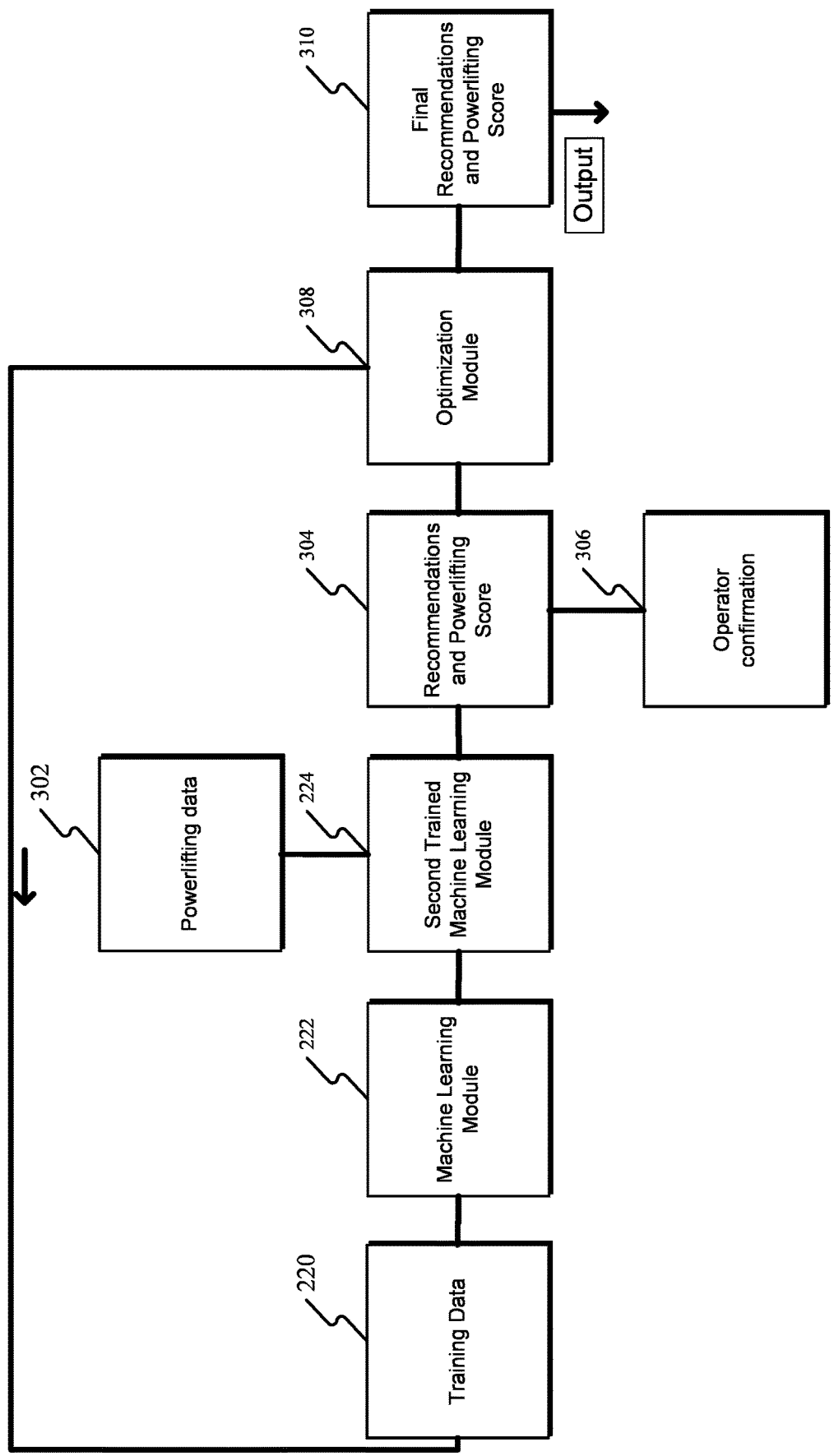
FIG. 3 depicts an example data flow of supervised machine learning for optimizing powerlifting recommendations in accordance with the present disclosure.

Further, the system 200 may "train" the second trained machine learning module 224 by using the machine learning module 222, the training data 220 and one or more inputs or feedbacks provided by a system operator to the system 200 over time. The concept of training the second trained machine learning module 224 may be understood by using the description below and the block diagram depicted in FIG. 3. Specifically, FIG. 3 depicts an example data flow 300 of supervised machine learning for optimizing powerlifting recommendations in accordance with the present disclosure.

A person ordinarily skilled in the art may appreciate that machine learning is an application of Artificial Intelligence (AI) using which systems (e.g., the system 200) may have the ability to automatically learn and improve from experience without being explicitly programmed. Machine learning focuses on use of data and algorithms to imitate the way humans learn. In some aspects, the machine learning algorithms may be created to make classifications and/or predictions. Machine learning based systems may be used for a variety of applications including, but not limited to, speech recognition, email filtering, image or video processing and recommendation-generation based on image/video processing, and/or the like.

Machine learning may be of various types based on data or signals available to the learning system. For example, the machine learning approach may include supervised learning, unsupervised learning, semi-supervised learning, or reinforcement learning. The supervised learning is an approach that may be supervised by a human. In this approach, the machine learning algorithm may use labeled training data and defined variables. In the case of supervised learning, both the input and the output of the algorithm may be specified/defined, and the algorithms may be trained to classify data and/or predict outcomes accurately.

Broadly, the supervised learning may be of two types, "regression" and "classification". In classification learning, the learning algorithm may help in dividing the dataset into classes based on different parameters. In this case, a computer program may be trained on the training dataset and based on the training, the computer program may categorize input data into different classes. Some known methods used in classification learning include Logistic Regression. K-Nearest Neighbors, Support Vector Machines (SVM), Kernel SVM, Naïve Bayes, Decision Tree Classification, and Random Forest Classification.

In regression learning, the learning algorithm may predict output value that may be of continuous nature or real value. Some known methods used in regression learning include Simple Linear Regression, Multiple Linear Regression, Polynomial Regression, Support Vector Regression, Decision Tree Regression, and Random Forest Regression. In some aspects, the system 200 may use regression learning.

The unsupervised learning is an approach that involves algorithms that may be trained on unlabeled data. An unsupervised learning algorithm may analyze the data by its own and find patterns in input data. Further, semi-supervised learning is a combination of supervised learning and unsupervised learning. A semi-supervised learning algorithm involves labeled training data; however, the semi-supervised learning algorithm may still find patterns in the input data. Reinforcement learning is a multi-step or dynamic process. This model is similar to supervised learning, but may not be trained using sample data. This model may learn "as it goes" by using trial and error. A sequence of successful outcomes may be reinforced to develop the best recommendation or policy for a given problem in reinforcement learning.

In an exemplary aspect, the machine learning module 222 may be a supervised machine learning module that may assist the system 200 (specifically, the processor 210) to provide accurate recommendations to a user (e.g., the user 108) to enhance powerlifting activity and/or mitigate user muscle imbalances based on the powerlifting video transmitted by the user 108 to the system 200 via the user device 202. The machine learning module 222 may further assist the processor 210 to provide accurate powerlifting score to the powerlifting activity based on the powerlifting video.

The machine learning module 222 may use the training data 220 (as labeled data) to generate the second trained machine learning module 224 (e.g., distributed models). Specifically, the machine learning module 222 may generate the second trained machine learning module 224 to optimize generation of recommendations and powerlifting score for the user 108.

As described above, the training data 220 may include a plurality of good and bad powerlifting videos. The training data 220 may further include data associated with correlations of movements of different user body parts, e.g., nose, hip, knee, neck, shoulder, elbow, wrist, ankle, ear, eye, toe, pelvis, waist, chest, skull, foot, head, etc. in good powerlifting videos and bad powerlifting videos. For example, the training data 220 may include information associated with correct body part movement (e.g., relative locations of body parts with respect to each other, speed of movement, etc.) when a user may be performing a "correct" deadlift, and information associated with incorrect body part movement when a user may be performing an "incorrect" deadlift. The training data 220 may further include correlations of known muscle imbalances with incorrect body part movement, which may facilitate the system 200 to determine one or more muscle imbalances that the user 108 may have based on the powerlifting video transmitted by the user device 202 to the system 200.

In some aspects, the second trained machine learning module 224 may be configured to receive powerlifting data 302 associated with the user 108 performing a powerlifting activity from the processor 210. The powerlifting data 302 may be derived based on the powerlifting video transmitted by the user device 202 to the system 200. The concept of the powerlifting data 302 is described later in the description below. Responsive to receiving the powerlifting data 302, the second trained machine learning module 224 may analyze the powerlifting data 302 and determine one or more recommendations for the user 108 and a powerlifting score based on powerlifting data analysis as shown in block 304 of FIG. 3.

In some aspects, during the initial "training" or "learning" phase of the second trained machine learning module 224, a system operator (not shown) may provide inputs or confirmation on the recommendations and the powerlifting score determined by the second trained machine learning module 224, as shown in block 306 of FIG. 3. Specifically, the system operator may either confirm or input that the determined recommendations and powerlifting score are correct, or may modify the determined recommendations and/or the powerlifting score as shown in block 306.

Responsive to receiving the inputs from the system operator, an optimization module 308 may optimize the recommendations and the powerlifting score determined by the second trained machine learning module 224, and may output final recommendations and/or the powerlifting score to the processor 210 as shown in block 310 of FIG. 3. In addition, the optimization module 308 may transmit feedback to the training data 220 to update or improve the training data 220, so that future recommendations and/or powerlifting scores may be accurate. The machine learning module 222 may use the "updated" training data 220 to generate an updated second trained machine learning module 224. In this manner, the system 200 (specifically, the second trained machine learning module 224) "learns" and improves future recommendations and/or powerlifting scores. The system 200 may not require the optimization module 308 when the second trained machine learning module 224 may be fully trained, and/or when the system operator confirms a substantial portion (e.g., more than 97-98%) of the recommendations and/or powerlifting scores provided by the second trained machine learning module 224 to be accurate.

The detailed process of providing recommendations to the user 108 and/or calculating the powerlifting score is described below in conjunction with describing the system operation.

In operation, the transceiver 208 may receive a powerlifting video from the user device 202 via the network 206. As described above, the powerlifting video may be associated with a powerlifting activity being performed by the user 108. The powerlifting activity may be, for example, squats, bench, deadlift, and/or the like. In some aspect, the powerlifting video may include a plurality of frames that may be sequentially combined together to form the powerlifting video.

Responsive to receiving the powerlifting video, the transceiver 208 may send the powerlifting video to the video database 214 for storage purpose. In addition, the transceiver 208 may transmit the received powerlifting video to the server 204 via the network 206. The server 204 may analyze the powerlifting video and may generate a plurality of body identification data associated with each frame of the powerlifting video. Example snapshots of body identification data is depicted in FIG. 4.

In some aspects, the plurality of body identification data may be associated with locations of a plurality of user body parts in each frame of the powerlifting video. Examples of user body parts include, but are not limited to, nose, hip, knee, neck, shoulder, elbow, wrist, ankle, ear, eye, toe, pelvis, waist, chest, skull, foot, head, and/or the like. As shown in FIG. 4, for a frame 402 captured at a timestamp of T=T1, the server 204 may generate first tabular body identification data 404. The first tabular body identification data 404 may include pixel locations (X, Y, Z coordinates) of nose, neck, shoulder, elbow, etc. in the frame 402 (along with frame identifier or frame number). Similarly, for a frame 406 captured at a timestamp of T=T2, the server 204 may generate second tabular body identification data 408 that may include pixel locations of same body parts in the frame 406. In a similar manner, the server 204 may generated the plurality of body identification data corresponding to all the frames included in the powerlifting video.

Responsive to generating the plurality of body identification data, the server 204 may transmit the plurality of body identification data to the transceiver 208 via the network 206. The transceiver 208 may send the received plurality of body identification data to the body identification data database 216 for storage purpose.

The processor 210 may obtain the powerlifting video from the video database 214 and the plurality of body identification data from the body identification data database 216 (or directly from the transceiver 208). Responsive to obtaining the powerlifting video, the processor 210 may execute instructions stored in the first trained machine learning module 218 to generate a plurality of feature maps associated with the plurality of frames of the powerlifting video. In some aspects, the first trained machine learning module 218 may be associated with a convolutional neural network (CNN) algorithm. In other aspects, the first trained machine learning module 218 may be associated with any other AI/ML based algorithm that may assist the processor 210 to generate the plurality of feature maps or vector maps for each frame of the powerlifting video. A person ordinarily skilled in the art may appreciate that feature maps or vector maps are generated to determine or identify presence/absence and/or locations of different objects (e.g., body parts) in an image or a video frame.

Responsive to generating the plurality of feature maps, the processor 210 may merge or fuse the plurality of body identification data and the plurality of feature maps for each frame of the powerlifting video to create a merged or fused dataset for each frame. The merged dataset (which may be same as the powerlifting data 302 described above in conjunction with FIG. 3) may include body part identifiers and X, Y, Z pixel coordinates for each body part in each video frame. In additional aspects, the processor 210 may determine velocity data and angular displacement data associated with each body part based on the plurality of body identification data, and may include the determined velocity data and angular displacement data in the merged dataset. Stated another way, the merged dataset may additionally include velocity data and angular displacement data associated with each user body part, when the user 108 may be performing the powerlifting activity.

In some aspects, the processor 210 may determine or calculate velocity data and angular displacement data by "tracking" movement of X, Y, Z pixel coordinates for each body part across the plurality of frames. For example, the processor 210 may track movement (e.g., velocity and angular displacement) of user knees by tracking X, Y, Z pixel coordinates for the user knees across the plurality of frames of the powerlifting video. If required, the processor 210 may extrapolate one or more X, Y, Z coordinate information if such information is missing for one or more frames in the body identification data obtained from the server 204.

A person ordinarily skilled in the art may appreciate that some (and not all) information associated with the powerlifting video can be determined based on the plurality of body identification data. For example, velocity data and angular displacement data may be determined by using the plurality of body identification data, as described above. However, additional information, e.g., presence or absence of user knee caving in the powerlifting video, may not be determined by using the plurality of body identification data. Such additional information may be determined by using the feature maps. Therefore, the processor 210 merges or fuses the plurality of body identification data and the plurality of feature maps to create the merged or fused dataset for each frame.

Responsive to creating the merged dataset, the processor 210 may execute the instructions stored in the second trained machine learning module 224 to analyze the merged dataset and determine one or more anomalies in the powerlifting activity and one or more user muscle imbalances based on merged dataset analysis. Specifically, as described above, the second trained machine learning module 224 may be trained using the training data 220 that includes a plurality of good and bad powerlifting videos, data associated with correlations of movements of different user body parts in good and bad powerlifting videos, data associated with correlations of known muscle imbalances with incorrect body part movements, and/or the like. In some aspects, the second trained machine learning module 224 may be associated with recurrent neural network (RNN). In other aspects, the second trained machine learning module 224 may be associated with any other AI/ML based algorithm.

The processor 210/second trained machine learning module 224 may correlate the training data 220 and the merged dataset to determine one or more anomalies in the powerlifting activity and one or more user muscle imbalances. For example, the processor 210 may determine that the user 108 may have quad weakness if the user's hips rise before user's knees extend in the powerlifting video.

Responsive to determining one or more anomalies in the powerlifting activity, the processor 210/second trained machine learning module 224 may determine improvement recommendations to mitigate the anomalies or improve/enhance the powerlifting activity. In this case, a mapping of a plurality of improvement recommendations with a plurality of known anomalies may be pre-stored in the memory 212 (e.g., as part of the training data 220 or otherwise), and the processor 210 may fetch the mapping from the memory 212. The processor 210 may compare the determined anomalies with the mapping and determine the improvement recommendations for the user 108. For example, the processor 210 may determine a recommendation for simultaneously extending the knees and rising the hips, when the processor 210 determines the anomaly as being "the user's hips rise before the user's knees extend".

In addition, responsive to determining one or more user muscle imbalances, the processor 210/second trained machine learning module 224 may determine mitigation recommendations to mitigate the muscle imbalances. In this case also, a mapping of a plurality of mitigation recommendations with a plurality of known muscle imbalances may be pre-stored in the memory 212 (e.g., as part of the training data 220 or otherwise), and the processor 210 may fetch the mapping from the memory 212. The processor 210 may compare the determined muscle imbalance(s) with the mapping and determine the mitigation recommendations for the user 108. For example, the processor 210 may determine specific exercises or diet plan as mitigation recommendation when the user 108 may be having quad weakness.

Responsive to determining the improvement recommendations and the mitigation recommendations, the processor 210 may transmit, via the transceiver 208, the recommendations to the user device 202. The user 108 may view the recommendations on a user device display screen and implement the recommendation to enhance the powerlifting activity and/or mitigate the muscle imbalance(s).

In further aspects, the processor 210 may be configured to execute instructions stored in the second trained machine learning module 224 and determine a powerlifting score for the user 108 based on the merged dataset. In some aspects, to determine the powerlifting score, the processor 210 may first obtain a plurality of scoring criteria associated with the powerlifting activity (e.g., deadlift) from the memory 212. In this case, the memory 212 may pre-store the plurality of scoring criteria associated with the powerlifting activity.

Examples of scoring criteria include, but are not limited to, knee alignment relative to toes, presence or absence of knee valgus, variation in torso angle when a user performs a powerlifting activity, acceptable depth (e.g., squat depth), presence or absence of elbow flair behind torso, and/or the like. In an exemplary aspect, on a scale of 0 to 1 (1 being the best), a user may be scored 0 when knees and toes are not in line during powerlifting activity, scored 0 when knees cave in, scored 1 when trunk angle is constant during ascent and descent of the powerlifting activity, and/or the like.

The processor 210 may correlate the plurality of scoring criteria obtained from the memory 212 with the user movement during the powerlifting activity determined based on the analysis of the merged dataset, and calculate a plurality of sub-scores for the user 108. In some aspect, each sub-score may be associated with each scoring criterion. For example, the processor 210 may calculate a first sub-score for the user 108 for the criterion of "knee alignment relative to toes", a second sub-score for the criterion of "presence or absence of knee valgus", a third sub-score for the criterion of "acceptable depth", and so on. Responsive to calculating the plurality of sub-scores, in some aspects, the processor 210 may calculate the powerlifting score for the user 108 by performing linear summation of the plurality of sub-scores, and normalizing the sum on a scale of 0 to 5 (5 being the best). In other aspects, the processor 210 may calculate the powerlifting score for the user 108 by performing weighted sum of the plurality of sub-scores, and normalizing the sum on a scale of 0 to 5 (5 being the best). In this case, corresponding weights associated with each scoring criterion may be pre-stored in the memory 212, and the processor 210 may fetch the weights from the memory 212 to calculate the powerlifting score. In some aspects, the processor 210 may calculate the powerlifting score for the overall powerlifting video. In other aspects, the processor 210 may calculate separate powerlifting score for each frame.

Figure 5:
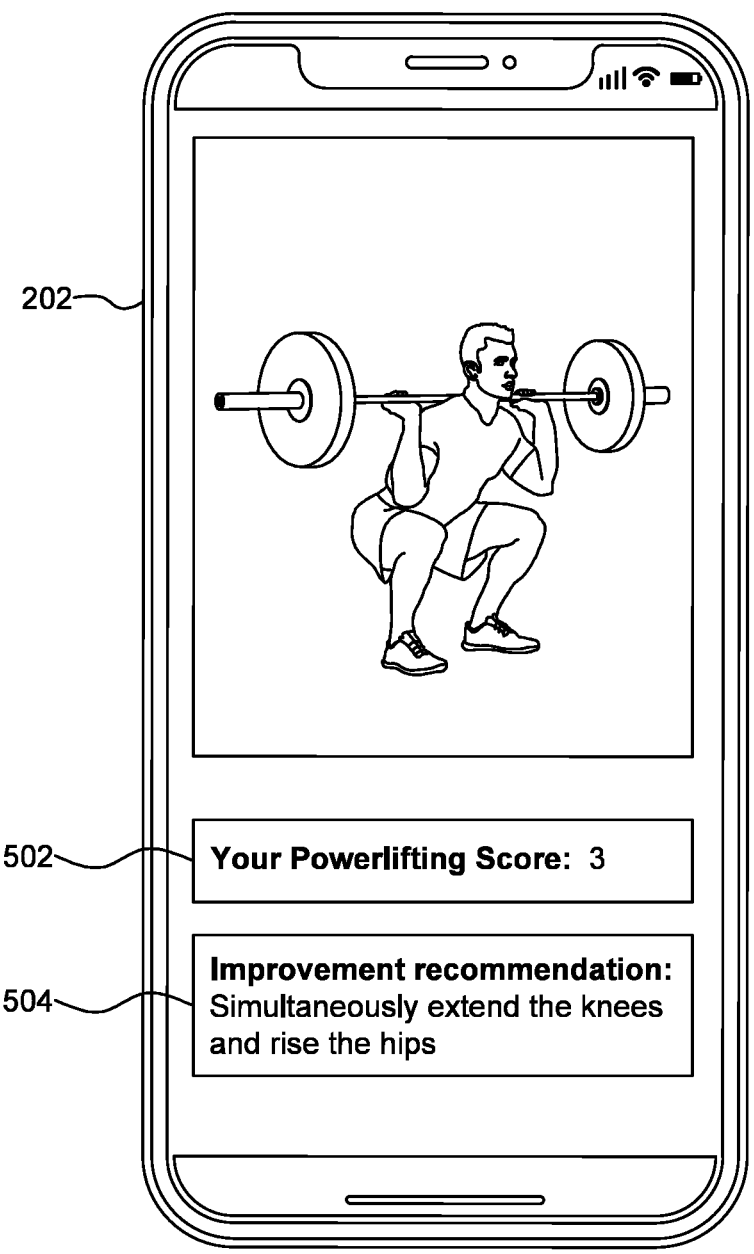
FIG. 5 depicts a snapshot of a powerlifting recommendation on a user device in accordance with the present disclosure.

Responsive to calculating the powerlifting score, the processor 210 may transmit, via the transceiver 208, the powerlifting score to the user device 202. An exemplary view of display screen of the user device 202 depicting a powerlifting score 502 and an improvement recommendation 504 is shown in FIG. 5.

Although the description above describes an aspect where the processor 210 determines the improvement recommendation, the mitigation recommendation and the powerlifting score based on the powerlifting video provided by the user 108 via the user device 202, in some aspects, the processor 210 may additionally obtains inputs from a light detection and ranging (lidar) sensor and/or an inertial measurement unit (IMU) that may be disposed on user body. The processor 210 may fuse the inputs obtained from the lidar sensor and/or the IMU with the merged dataset described above to create an "augmented" dataset. The processor 210 may determine the improvement recommendation, the mitigation recommendation and/or the powerlifting score based on the augmented dataset in the same manner as described above. A person ordinarily skilled in the art may appreciate that by fusing inputs from a plurality of data sources (e.g., camera, lidar sensor and/or the IMU), an accuracy and confidence level of recommendations and powerlifting score may be increased. In further aspects, the processor 210 may obtain videos from different angles of the user 108 performing the powerlifting activity to further improve accuracy and confidence level of recommendations and powerlifting score.

Figure 6:
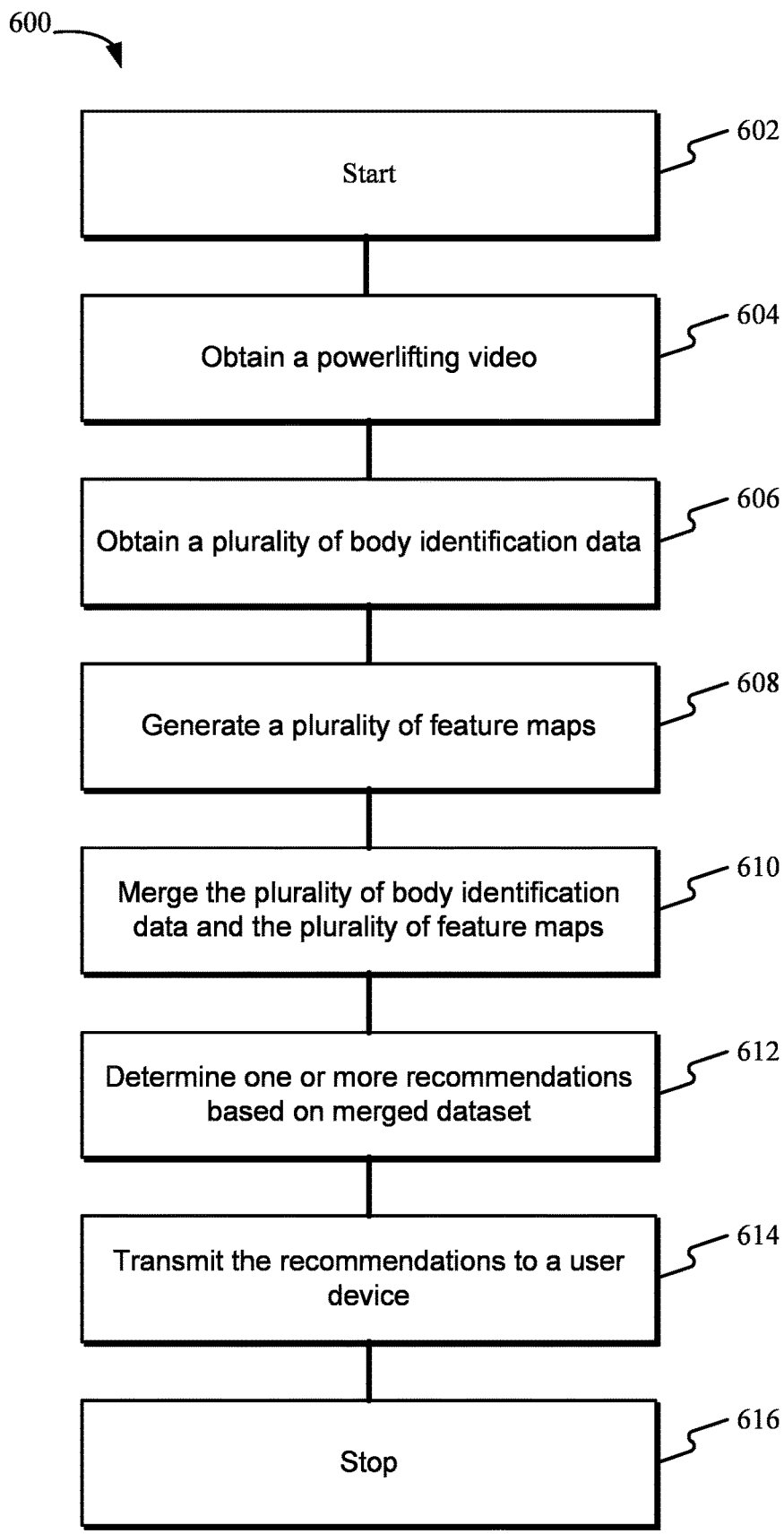
FIG. 6 depicts a flow diagram of an example powerlifting training method in accordance with the present disclosure.

FIG. 6 depicts a flow diagram of an example powerlifting training method 600 in accordance with the present disclosure. FIG. 6 may be described with continued reference to prior figures, including FIGS. 1-5. The following process is exemplary and not confined to the steps described hereafter. Moreover, alternative embodiments may include more or less steps that are shown or described herein and may include these steps in a different order than the order described in the following example embodiments.

Referring to FIG. 6, at step 602, the method 600 may commence. At step 604, the method 600 may include obtaining, by the processor 210, the powerlifting video from the user device 202. At step 606, the method 600 may include obtaining, by the processor 210, the plurality of body identification data from the server 204. As described above, the processor 210 may transmit, via the transceiver 208, the powerlifting video to the server 204, and the server 204 may transmit the body identification data to the processor 210 responsive to receiving the powerlifting video from the server 204.

At step 608, the method 600 may include generating, by the processor 210, the plurality of feature maps associated with each frame of the powerlifting video by executing instructions stored in the first trained machine learning module 218. At step 610, the method 600 may include merging, by the processor 210, the plurality of feature maps and the plurality of body identification data to create a merged dataset.

At step 612, the method 600 may include determining, by the processor 210, one or more recommendations to improve the powerlifting activity and/or mitigate user muscle imbalance(s) based on the merged dataset. As described above in conjunction with FIG. 2, the processor 210 may determine the recommendations by executing instructions stored in the second trained machine learning module 224.

At step 614, the method 600 may include transmitting, by the processor 210 via the transceiver 208, the recommendations to the user device 202.

At step 616, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A powerlifting training method comprising:
    obtaining, by a processor, a powerlifting video associated with a user from a user device, wherein the powerlifting video comprises a plurality of frames;
    obtaining, by the processor, a plurality of body identification data associated with each frame from a server, wherein the plurality of body identification data is associated with locations of a plurality of body parts in each frame;
    generating, by the processor, a plurality of feature maps associated with the plurality of frames by using a first trained machine learning module;
    merging, by the processor, the plurality of body identification data and the plurality of feature maps to create a merged dataset for each frame;
    determining, by the processor via a second trained machine learning module, one or more recommendations based on the merged dataset, wherein the one or more recommendations comprise a recommendation to enhance a powerlifting activity; and
    transmitting, by the processor, the one or more recommendations to the user device.

2. The powerlifting training method of claim 1, wherein the powerlifting video is associated with the powerlifting activity performed by the user.

3. The powerlifting training method of claim 1, wherein the plurality of body parts comprises at least one of: nose, hip, knee, neck, shoulder, elbow, wrist, ankle, ear, eye, toe, pelvis, waist, chest, skull, foot, and head.

4. The powerlifting training method of claim 3 further comprising determining velocity data and angular displacement data associated with each body part based on the plurality of body identification data.

5. The powerlifting training method of claim 4, wherein determining the one or more recommendations comprises determining the one or more recommendations based on the velocity data and the angular displacement data.

6. The powerlifting training method of claim 1, wherein the first trained machine learning module is associated with convolutional neural network (CNN).

7. The powerlifting training method of claim 1, wherein the second trained machine learning module is associated with recurrent neural network (RNN).

8. The powerlifting training method of claim 1 further comprising training the second trained machine learning module by using a training data.

9. The powerlifting training method of claim 8, wherein the training data comprises a plurality of correct powerlifting activity videos and a plurality of incorrect powerlifting activity videos.

10. The powerlifting training method of claim 8 further comprising:
    determining one or more anomalies in the powerlifting activity and a user muscle imbalance based on the merged dataset and the training data; and
    determining the recommendation to enhance the powerlifting activity based on the one or more anomalies.

11. The powerlifting training method of claim 10 further comprising determining a recommendation to mitigate the user muscle imbalance, wherein the one or more recommendations further comprises the recommendation to mitigate the user muscle imbalance.

12. The powerlifting training method of claim 1 further comprising:
    obtaining a plurality of scoring criteria associated with the powerlifting activity;
    calculating a plurality of sub-scores for the powerlifting activity based on the merged dataset and the plurality of scoring criteria;
    calculating a powerlifting activity score based on the plurality of sub-scores; and
    transmitting the powerlifting activity score to the user device.

13. The powerlifting training method of claim 12, wherein calculating the powerlifting activity score comprises calculating the powerlifting activity score by performing a weighted sum of the plurality of sub-scores.

14. The powerlifting training method of claim 1, wherein the powerlifting activity is at least one of: a squat, a deadlift or a bench.

15. The powerlifting training method of claim 1 further comprising:
    obtaining inputs associated with the powerlifting activity from at least one of a lidar sensor and an inertial measurement unit;
    fusing the merged dataset with the inputs to create an augmented dataset; and
    determining the one or more recommendations based on the augmented dataset.

16. A powerlifting training system comprising:
a transceiver configured to:
receive a powerlifting video associated with a user from a user device, wherein the powerlifting video comprises a plurality of frames; and
receive a plurality of body identification data associated with each frame from a server, wherein the plurality of body identification data is associated with locations of a plurality of body parts in each frame;
a memory configured to store a first trained machine learning module, a second trained machine learning module and a training data, wherein:
the second trained machine learning module is trained by using the training data, and
the training data comprises a plurality of correct powerlifting activity videos and a plurality of incorrect powerlifting activity videos; and
a processor communicatively coupled to the transceiver and the memory, wherein the processor is configured to obtain the powerlifting video and the plurality of body identification data from the transceiver and execute instructions stored in the first trained machine learning module and the second trained machine learning module to:
generate a plurality of feature maps associated with the plurality of frames by using the first trained machine learning module;
merge the plurality of body identification data and the plurality of feature maps to create a merged dataset for each frame;
determine, by using the second trained machine learning module, one or more recommendations based on the merged dataset, wherein the one or more recommendations comprise a recommendation to enhance a powerlifting activity; and
transmit the one or more recommendations to the user device.

17. The powerlifting training system of claim 16, wherein the processor is further configured to:
determine one or more anomalies in the powerlifting activity and a user muscle imbalance based on the merged dataset and the training data; and
determine the recommendation to enhance the powerlifting activity based on the one or more anomalies.

18. The powerlifting training system of claim 17, wherein the processor is further configured to determine a recommendation to mitigate the user muscle imbalance, and wherein the one or more recommendations further comprises the recommendation to mitigate the user muscle imbalance.

19. The powerlifting training system of claim 16, wherein the processor is further configured to:
determine velocity data and angular displacement data associated with each body part based on the plurality of body identification data; and
determine the one or more recommendations based on the velocity data and the angular displacement data.

20. A non-transitory computer-readable storage medium in a distributed computing system, the non-transitory computer-readable storage medium having instructions stored thereupon which, when executed by a processor, cause the processor to:
obtain a powerlifting video associated with a user from a user device, wherein the powerlifting video comprises a plurality of frames;
obtain a plurality of body identification data associated with each frame from a server, wherein the plurality of body identification data is associated with locations of a plurality of body parts in each frame;
generate a plurality of feature maps associated with the plurality of frames by using a first trained machine learning module;
merge the plurality of body identification data and the plurality of feature maps to create a merged dataset for each frame;
determine, via a second trained machine learning module, one or more recommendations based on the merged dataset, wherein the one or more recommendations comprise a recommendation to enhance a powerlifting activity; and
transmit the one or more recommendations to the user device.

* * * * *